(12) United States Patent
Grefenstette

(10) Patent No.: US 6,289,304 B1
(45) Date of Patent: Sep. 11, 2001

(54) TEXT SUMMARIZATION USING PART-OF-SPEECH

(75) Inventor: Gregory Grefenstette, Gieres (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/270,457

(22) Filed: Mar. 17, 1999

(30) Foreign Application Priority Data

Mar. 23, 1998 (GB) .................................................. 9806085

(51) Int. Cl.[7] ............................. G06F 17/27; G06F 17/21
(52) U.S. Cl. .................................................. 704/9; 707/531
(58) Field of Search ................................... 345/333; 704/1, 704/9, 10; 707/530, 531, 1, 4, 101, 500

(56) References Cited

U.S. PATENT DOCUMENTS

| | | | |
|---|---|---|---|
| 5,077,668 | * 12/1991 | Doi | 704/9 |
| 5,384,703 | * 1/1995 | Wihgott et at. | 704/9 |
| 5,488,719 | * 1/1996 | Kaplan et al. | 704/9 |
| 5,680,628 | * 10/1997 | Carus et al. | 704/9 |
| 5,708,825 | * 1/1998 | Sotomayor | 704/9 |
| 5,721,939 | * 2/1998 | Kaplan | 704/9 |
| 5,748,805 | 5/1998 | Withgott et al. | 704/9 |
| 5,778,397 | * 7/1998 | Kupiec et al. | 704/9 |
| 5,918,240 | * 6/1999 | Kupiec et al. | 707/531 |
| 5,924,108 | * 7/1999 | Fein et al. | 707/531 |
| 5,960,383 | * 9/1999 | Fleischer | 704/9 |
| 5,963,205 | * 10/1999 | Sotomayor | 345/333 |
| 5,978,820 | * 11/1999 | Mase et al. | 707/531 |

OTHER PUBLICATIONS

Sager, Naomi Natural Language Information Processing: A Computer Grammar of English and Its Applications, Addison–Wesley Publishing Company, Inc., Massachusetts, 1981, pp. 7–16 and pp. 253–255.

* cited by examiner

Primary Examiner—Patrick N. Edouard

(57) ABSTRACT

Text is summarized using part-of-speech (POS) data indicating parts of speech for tokens in the text. The POS data can be obtained using input text data defining the text, such as by POS tagging. The POS data can be used to obtain group data indicating groups of tokens of the text, such as verb groups and noun groups. The group data can also indicate, within each group, any tokens that meet a POS based removal criterion. The group data can be used to obtain summarized text data by removing tokens that meet the removal criterion. The original text may be obtained via scanner or video camera from a user's document, and may be recognized to obtain input text data. The summarized text may output as text or as audio pronunciation using a speech synthesizer.

20 Claims, 7 Drawing Sheets

| | |
|---|---|
| Input text | The big black dog eats the bones on the kitchen floor. |
| After step s1 | The big black dog eats the bones on the kitchen floor. |
| After step s2 | The big black dog eats the bones on the kitchen floor . |
| After step s3 | The big black dog eats the bones on the kitchen floor . |
| After step s4 | The/DT big/JJ black/JJ dog/NN eats/VBZ the/DT bones/NNS on/IN the/DT kitchen/NN floor/NN ./SENT |
| After step s5 | The/DT big/JJ black/JJ dog/NN [VG *Actv eats/VBZ VG] the/DT bones/NNS on/IN the/DT kitchen/NN floor/NN ./SENT |
| After step s6 | [NG The/DT big/JJ black/JJ *HeadN dog/NN NG] [VG *Actv eats/VBZ VG] [NG the/DT *HeadN bones/NNS on/IN the/DT kitchen/NN *HeadN floor/NN NG] ./SENT |
| After step s7 | [NG *HeadN dog/NN NG] [VG *Actv eats/VBZ VG] [NG *HeadN bones/NNS on/IN *HeadN floor/NN NG] ./SENT |
| After step s8 | dog eats bones on floor . |
| After step s9 | dog eats bones on floor. |

*FIG. 4*

Original text: Former Democratic National Committee finance director Richard Sullivan faced more pointed questioning from Republicans during his second day on the witness stand in the Senate's fund-raising investigation. While he grew flustered at times, the 33-year-old Sullivan stayed tight-lipped, downplaying concerns about former fund-raiser John Huang.

*FIG. 5*

After markup: [NC Former/JJ Democratic/JJ National/JJ Committee/NN finance/NN director/NN Richard/NP *HeadN Sullivan/NP NC] [VC *ActV faced/VBD more/AP VC] [NC *FreeAdj pointed/JJ *HeadN questioning/VBG from/IN *PrepN Republicans/NNS during/IN his/PP$ second/OD *PrepN day/NN on/IN the/AT witness/NN *PrepN stand/NN in/IN the/AT *PrepN Senate/NP 's/POS *IngV fund-raising/VBG *PrepN investigation/NN NC] . while/CS [NC *HeadN he/PPS NC] [VC grew/VBD *ActV flustered/VBN VC] [NC at/IN *PrepN times/NNS NC] ,/CM [NC the/AT 33-year-old/CD *HeadN Sullivan/NP NC] [VC *ActV stayed/VBD VC] [NC *HeadN tight-lipped/JJ NC] ,/CM downplaying/VBG [NC *HeadN concerns/NNS about/IN former/JJ fund-raiser/JJ John/NP *PrepN Huang/NP NP NC] .

FIG. 6

Output(level 1 reduction): Richard Sullivan Republicans Senate Sullivan John Huang .

Output(level 2 reduction): Richard Sullivan pointed questioning . Sullivan tight-lipped concerns.

Output(level 3 reduction): Richard Sullivan faced pointed questioning . Sullivan stayed tight-lipped concerns

Output(level 4 reduction): Richard Sullivan faced pointed questioning from Republicans during day on stand in Senate fund-raising investigation . Sullivan stayed tight-lipped concerns about John Huang .

...

Output(level 8 reduction): Richard Sullivan faced pointed questioning from Republicans during day on stand in Senate fund-raising investigation . he flustered at times Sullivan stayed tight-lipped concerns about John Huang .

FIG. 7

TEXT SUMMARIZATION USING PART-OF-SPEECH

FIELD OF THE INVENTION

The invention relates to automatic text summarization based on part-of-speech.

BACKGROUND AND SUMMARY OF THE INVENTION

A conventional reading machine for the blind or visually impaired allows the user to manually increase the rate at which text in a scanned document is converted into speech, making it possible to generate very rapid speech and thus audibly flip through the document to obtain a sort of summary. Also, the user could manually select samples of the document and generate speech from each sample to obtain another type of summary.

A number of automatic summarization techniques have been proposed in other contexts. According to one such technique, manually derived templates are used to match certain patterns in text. When the templates are filled, a gloss of the template can be produced by the computer. This gloss ignores any item that was not included in the template and thereby reduces the quantity of text. This is the approach used by the participants in the yearly Message Understanding Conference (MUC). A drawback of this technology is that building templates is a long manual process that produces a domain-specific filter that cannot be applied to unrestricted text.

According to another known method it is necessary to read an entire text into memory and calculate statistics of word use, the most frequent terms being deemed to be most important for the sense of the text. Then, the original text is rescanned in memory and entire sentences are scored in terms of position and term importance. The highest scoring sentences are extracted in their entirety as the summary of the text. A disadvantage of this sort of summarization is that it cannot be done on a page by page basis without having to read in an entire document.

Sager, N., *Natural Language Information Processing—A Computer Grammar of English and Its Applications*, Reading, Mass.: Addison-Wesley, 1981, 7–16 and 253–255, describes a technique for teaching a second language that applies a string excision method starting at the end of a sentence and moving leftward. The method excises one word or a word sequence from the sentence if the residue is again a grammatical sentence; this is repeated for each successive residue until no more excisions are possible. Examples of excisions include removal of a prepositional phrase, reduction of the number of elements in a conjunction, and so forth. The excision analyses of a French sentence and its English translation proved to be remarkably similar.

The invention addresses problems that arise in automatically summarizing text, particularly problems that would affect persons with visual impairment or other persons who cannot view text. For example, a person may be driving a vehicle or performing another activity that precludes looking at text. Or a person may not have time to look at a text or to read the text in its entirety. Or lighting or display conditions may make it impossible to see a text in a printed or displayed form.

The invention addresses the problem of how to automatically summarize text in a way that retains words that are likely to indicate the meaning of the text while retaining very few words that are unlikely to indicate meaning. More specifically, the invention addresses the problem of automatically summarizing short texts, on which no statistical method would be able to work due to lack of sufficient data. Similarly, the invention addresses the problem of how to automatically summarize sentences in a principled manner so that the summarized sentences are shorter than the original ones. The invention also addresses the problem of how to automatically summarize text simply and efficiently, such as in a way that does not require creation of templates and that in principle can be performed in one pass. The invention also addresses the problem of how to automatically summarize text in a way that provides an appropriate level of brevity.

The invention alleviates these problems by providing techniques that use part-of-speech (POS) information in automatically summarizing text. Some of the techniques use the POS information to distinguish, within a group of consecutive tokens, between tokens to be removed and tokens to be retained during automatic summarization. Some of the techniques perform automatic summarization by applying a POS-based criterion selected by a user.

The invention provides a technique for automatically summarizing text in which input text data are used to obtain POS data indicating part of speech for tokens in a text. The POS data are used to obtain group data indicating groups of consecutive tokens and indicating, within each group, any tokens that meet a POS based removal criterion. The group data are then used to obtain a summarized version of the text in which tokens that meet the removal criterion have been removed, thus reducing the number of tokens.

The group data can indicate more than one group type, and each group type can have a respective removal criterion. For example, the group data can indicate first and second word group types, and first and second POS based removal criteria can be applicable to the first and second word group types, respectively. For example, the types can include verb group types, noun group types, prepositional phrase group types, and a subclause group type (which might include other groups), and each group can be preceded and followed by elements indicating the group's type. Within each group of each type, the group data can indicate tokens that meet the applicable removal criterion.

The input text can be tokenized to obtain tokenized sentences, and POS data can be obtained for each tokenized sentence. The sentence's POS data can then be used to obtain group data for the sentence, which can in turn be used to summarize the sentence.

The input text can be obtained by converting image data to machine readable text data representing text matter contained by an image bearing portable medium. The summarized text can be converted to audio data representing the pronunciation of words in the summarized text, and corresponding sounds can be emitted, thus providing an audio summary of the text.

The invention also provides a technique for automatically summarizing text in which a signal from a user input device selects one of a set of POS based removal criteria. The input text data are used to obtain POS data indicating part of speech for tokens in a text, and the POS data are used to obtain a summarized version of the text in which tokens are removed in accordance with the selected POS based criterion, thus reducing the number of tokens.

To obtain the signal selecting the criterion, an image showing the set of POS based removal criteria can be displayed to allow interactive selection or a signal may be obtained based on the position of a manual knob that indicates the criterion. As above, the summarized text can be converted to audio data representing the pronunciation of words in the summarized text, and corresponding sounds can be emitted, thus providing an audio summary of the text.

Each of the above techniques can be implemented in a system that includes input text data and a processor that automatically summarizes text. Furthermore, each technique can be implemented in an article of manufacture that includes instruction data stored by a storage medium, indicating instructions that a system's processor can execute in automatically summarizing text.

The invention provides techniques that are advantageous because they can reduce the length of a text while retaining the meaning, thus reducing the time needed to perform text-to-speech synthesis or other operations that depend on having a summarized version of text. The invention can be implemented with a light syntactic parser to identify which parts of the text can be eliminated. The elimination can be graduated under user control, possibly via a knob, so that more or less of the text is retained. In the extreme case only the important nouns or proper names are retained.

The invention would allow a blind reader to audibly scan text, obtaining an audible summary of the text, as a sighted reader can, in order to decide which part of the text should be read in entirety. For at least this application, the invention improves on conventional statistics-based summarization techniques for three reasons: (1) The important parts of each sentence in the text can be read, rather than only selected sentences; (2) the techniques of the invention can be implemented to work on one pass through the text, whereas conventional statistics-based summarization requires two; and (3) the techniques of the invention can be applied to short texts as well as long texts since they can be implemented without using statistics as conventional statistics-based summarization does. The techniques of the invention improve on template-based techniques since they can be implemented without manual template building.

The invention can be suitably employed in the treatment of text between optical character recognition and text-to-speech generation. The input text can be electronically read sentence-by-sentence and an implementation of the invention can produce a reduced version as output text according to the level of reduction currently requested by the user. There is no need to buffer information from the entire text. The input sentence can undergo a series of linguistic markups using finite-state transducer technology. These markups can indicate linguistic aspects of the input text such as the parts of speech of each word in the context of the given sentence, the boundaries of groups, and the head elements within each group. The techniques of the invention can be implemented by reading the input text, applying the markings in a way such as that described below, and then selecting elements to be output according to the level of reduction requested by the user.

An advantage of the present invention is that it can be implemented to produce telegraphic (i.e. short, concise, terse) text from input text on the fly. A further advantage is that the level of the telegraphic reduction can be controlled by the user from a most extreme reduction up to nearly full text.

Techniques according to the invention can suitably be applied to text-stream summarization needs, such as in a reader for the blind (such as the ReadingEdge, formerly sold by Xerox Imaging Systems), since reduction can be performed sentence-by-sentence. This approach improves over statistics-based summarization whose algorithms require that the whole document be read into memory before summarization can be performed.

The following description, the drawings, and the claims further set forth these and other aspects, objects, features, and advantages of the invention.

BRIEF DESCRIPTION OF THE DRAWINGS

FIG. 4 illustrates the results of the various steps in FIG. 3 for an exemplary input sentence of text.

FIGS. 5, 6, and 7 illustrate the results of selected ones of the steps in FIG. 3 for an exemplary input text, showing various levels of reduction.

DETAILED DESCRIPTION OF THE INVENTION

Figure 1:
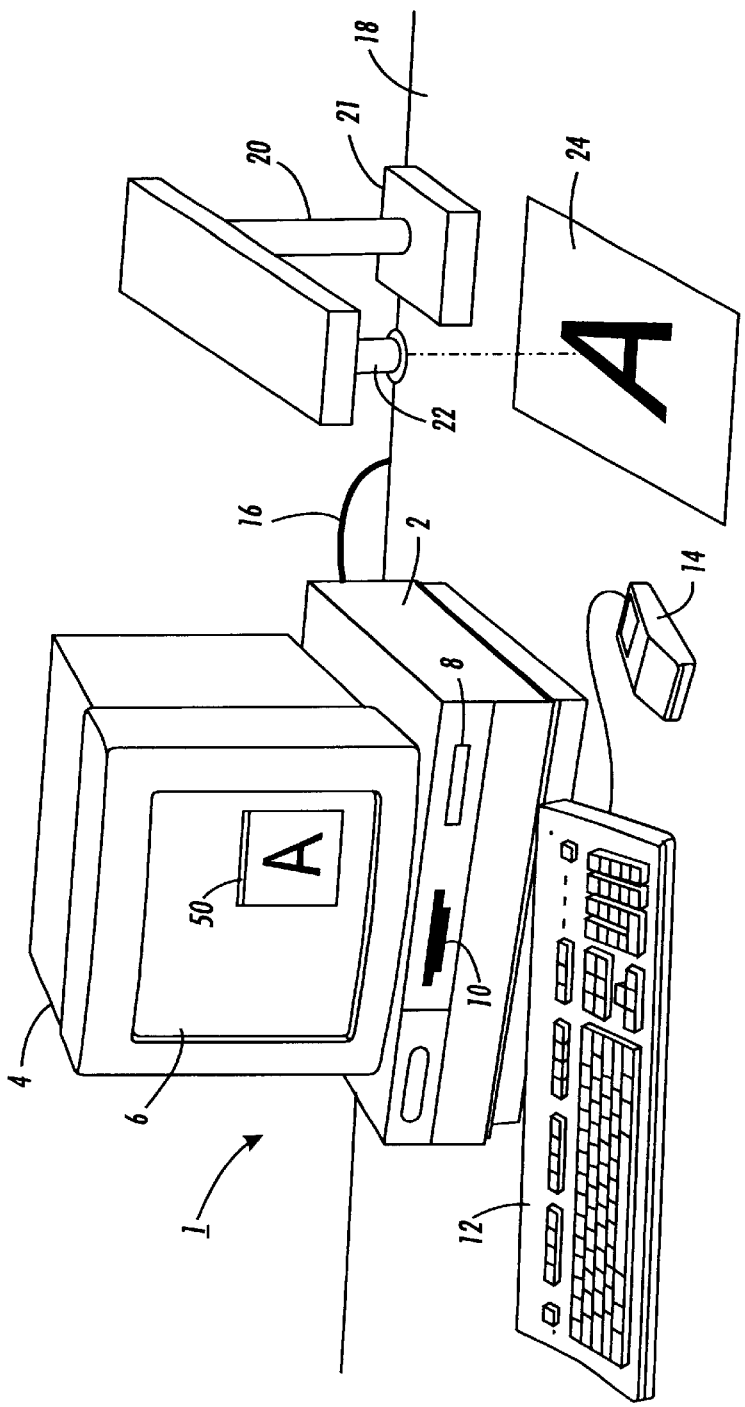
FIG. 1 shows an example of a computer based over-the-desk scanning system in which automatic summarization may be implemented.

The following definitions are helpful in understanding the broad scope of the invention, and the terms defined below have the indicated meanings throughout this application, including the claims.

A "storage medium" is a physical medium that can store data. Examples of storage media include magnetic media such as diskettes, floppy disks, and tape; optical media such as laser disks and CD-ROMs; and semiconductor media such as semiconductor ROMs and RAMs.

A "storage medium access device" is a device that includes circuitry that can access data on a data storage medium. Examples include drives for accessing magnetic and optical data storage media.

A "processor" is a component that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations. A processor may include one or more central processing units or other processing components.

A processor performs an operation or a function "automatically" when it performs the operation or function independent of concurrent human intervention or control.

As used herein, the notions of "token" and "token break" are closely related: A "token break" is a string of one or more elements that meets a criterion for separating tokens (a "token break criterion"), while a "token" is a string of one or more elements, each of which is a character or a combination of characters, where the string does not include an internal token break according to the applicable token break criterion. Token break criteria applicable to languages such as French and English often treat strings of one or more spaces as token breaks. In addition to correctly spelled words, abbreviations, acronyms, contractions, misspellings and nonsense words, mathematical and logical expressions including formulas and equations, combinations of punctuation marks that do not meet a break criterion (such as dotted lines, signature lines, "smileys", etc.), and various other types of strings of characters, whether or not semantically meaningful, can all be tokens under this definition if they do not include internal token breaks under an applicable criterion. Also, SGML and XML tags and other such strings of characters relating to hyperlinking, formatting, and so forth, are treated as tokens under some token break criteria. Under this definition, a "word" or "word token" is a token that is also a semantically meaningful unit.

A "text" is a series of characters that forms a series of tokens separated by token breaks. A text may be "defined", for example, by a written or printed series of characters or by an item of data that includes a series of character codes.

To "tokenize" is to divide a text into tokens according to a token break criterion. A "tokenizer" is used herein to mean a data structure, program, object, or device that can be used to tokenize text.

As used herein, the notions of "sentence" and "sentence break" are similarly related: A "sentence break" is a string of one or more tokens that meets a criterion for separating sentences (a "sentence break criterion"), while a "sentence" is a string of one or more tokens, where the string does not include an internal sentence break according to the applicable sentence break criterion. Sentence break criteria applicable to languages such as French and English often treat tokens that are strings of one or more appropriate sentence-ending punctuation marks as sentence breaks, such as a period, a question mark, an exclamation point, etc. Such tokens may be referred to herein as "sentence-final".

A token's "part of speech" or "POS" is the grammatical function the token plays in text, and can include a default part of speech that is assigned to a token when no other POS can be obtained for the token.

A "POS based removal criterion" is a criterion that can be applied to parts of speech of tokens in a text to determine which tokens to remove from the text and which to retain. Tokens that "meet" a removal criterion can thus be removed to obtain a summary of the text. The same summary could be obtained by retaining only tokens that do not meet the removal criterion, and "removal" is used herein to encompass both approaches.

A "word group type" is one of a set of types applicable to groups of tokens in text. Examples include verb groups, noun groups, prepositional phrase groups, and subclause groups (which might include other groups).

A POS based removal criterion is "applicable" to groups of a given word group type if, within groups of that type, it is possible to determine which tokens meet the criterion and which do not based on POS of the tokens.

Figure 2:
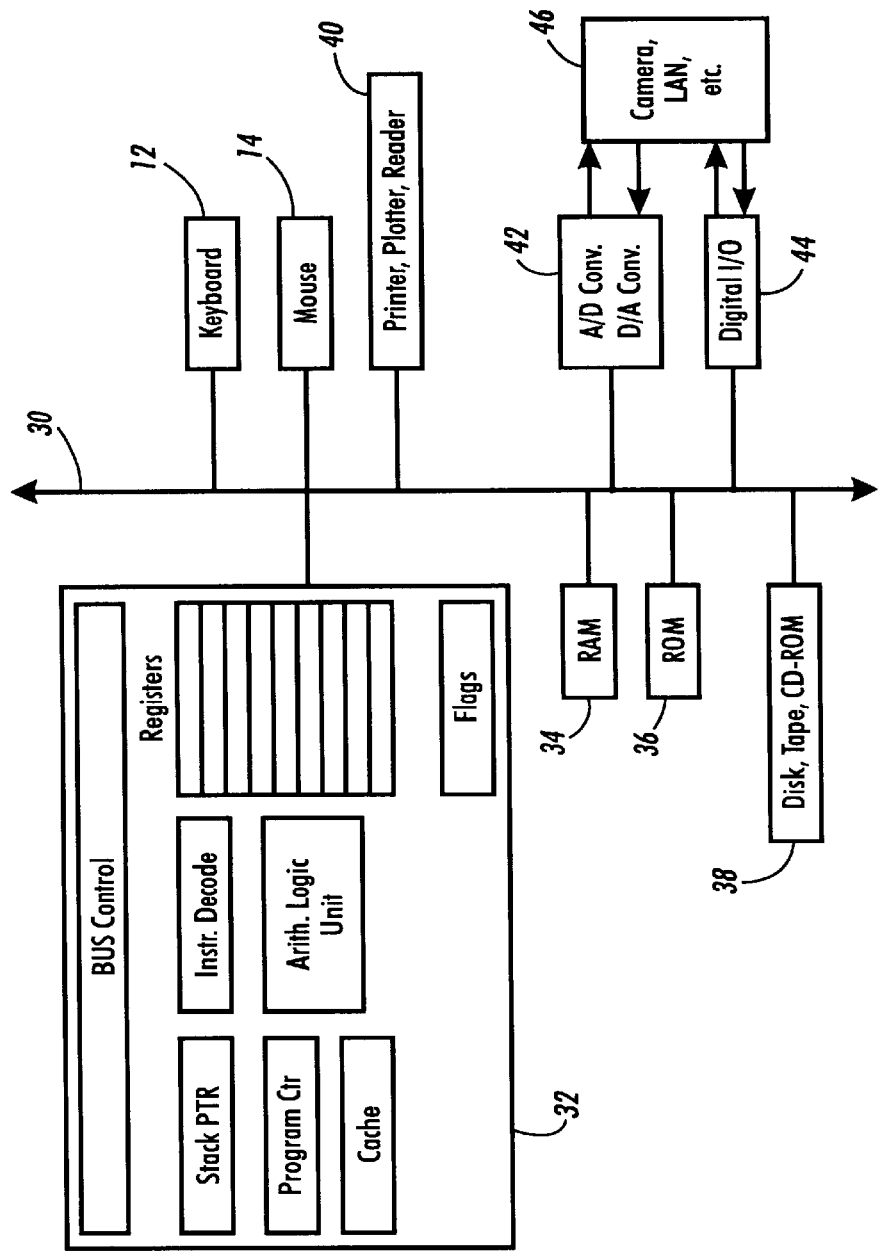
FIG. 2 is a schematic block diagram of a computer that can be used in the system of FIG. 1.

FIGS. 1 and 2 illustrate a computer-based over-the-desk scanning system, one of many types of systems in which techniques according to the present invention may be implemented. The operation of the arrangement of FIGS. 1 and 2 is described in more detail in copending, coassigned U.S. patent application Ser. No. 08/893,720, entitled "Screen-Based Interface for Interactive Desktop System" and incorporated herein by reference. The invention could, of course, be implemented in a wide variety of other systems in which a processor has access to data defining text, including conventional desktop and portable personal computers and workstations as well as reading machines, digital copiers, multifunction machines (e.g. capable of scanning, printing, copying, facsimile, and other operations), and other systems in which a scanner can provide image data defining an image of text to a processor that can perform OCR.

In FIG. 1, computer system 1 includes housing 2, CRT monitor 4 with display screen 6, hard disk drive 8, floppy disk drive 10, keyboard 12, and mouse 14. The computer is coupled to network cable 16 which, with a conventional internal driver card (not shown) and appropriate software (such as Netware®, available from Novell Corporation), enables the computer to form part of a local area network (LAN), wide area network (WAN), or other network.

Rigid frame 20 is affixed to surface 18 supporting system 1 by bracket 21 or another suitable claming arrangement (not shown). Video camera 22 is mounted within an upper section of frame 20; alternatively, camera 22 may be mounted on a bookshelf or other rigid arrangement above surface 18. Document 24 is positioned in the field of view of camera 22.

FIG. 2 shows schematically the hardware of computer system 1 of FIG. 1. System 1 includes common bus 30 and, connected to it, central processing unit (CPU) 32; memory devices including random access memory (RAM) 34, read only memory (ROM) 36, and drives 38 for accessing data stored on disk, tape, CD-ROM, or another storage medium; keyboard 12; mouse 14; printing, plotting, or scanning devices 40; and analog to digital (A/D) and digital to analog (D/A) conversion devices 42 and digital input/output (I/O) devices 44 providing interfaces to external devices 46 such as camera 22 and the rest of the LAN or WAN (not shown).

In use, video camera 22 captures images of object (e.g. documents) on the surface 18 and these images are displayed in real-time in a window 50 on the computer display screen 6. In this way textual matter may be scanned in from such a document for subsequent processing (including OCR and summarization).

Figure 3:
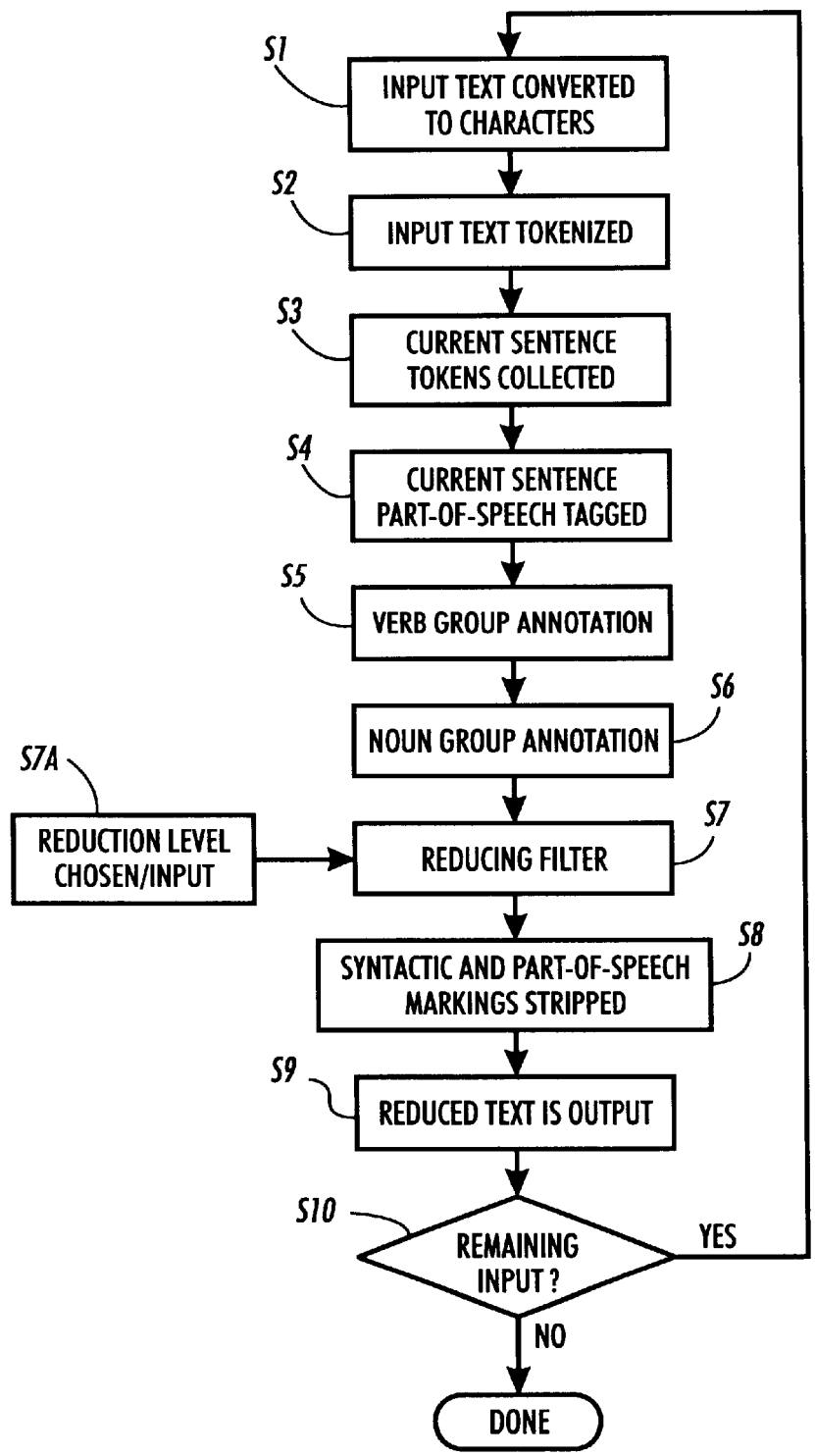
FIG. 3 is a flow diagram schematically illustrating processing steps that perform automatic summarization.

FIG. 3 is a flow diagram schematically illustrating acts performed in an implementation of one embodiment of the invention. The acts shown in FIG. 3 can be performed by CPU 32, which can perform them in executing instructions indicated by instruction data received from a network through cable 16; retrieved from memory, such as RAM 34, ROM 36, or other local or remote memory; or accessed on a disk, tape, CD-ROM, or other storage medium by drives 38 and provided to CPU 32.

In box s1, an input document or portion of text (which could come from any optical character reader or the video scanning system described above with references to FIGS. 1 and 2, or from any other source of signals representing text) is converted into input text data defining the text. The input text data could, for example, be a stream of computer-readable character codes obtained from OCR operations on an image of the input document. It will, however, be appreciated by persons skilled in the art that the input text data could be derived from a conventional computer based file retrieved from memory or a peripheral device or received from a network, such as an HTML World Wide Web document, or could be received from a voice recognition system (employing a suitable microphone, interface and voice recognition software) generating text from a user's utterances conveyed directly or via a suitable communications infrastructure. In any event, the input text data can be stored in memory, such as in RAM 34 or other local or remote memory.

Language identification can be performed on the input text data obtained in box s1 to allow language-specific operations during subsequent operations. Techniques for automatic language identification are described, for example, in Beesley, K. R., "Language Identifier: A Computer Program for Automatic Natural-Language Identification of On-Line Text", *Language at Crossroads: Proceedings of the 29$^{th}$ Annual Conference of the American*

Translators Association, Oct. 12–16, 1988, pp. 47–54, and Grefenstette, G., "Comparing Two Language Identification Schemes," *JADT* 1995, 3rd *International Conference on Statistical Analysis of Textual Data*, Rome, Dec. 11–13, 1995, pp. 263–268.

Next, in box s2, the character stream or other input text data from box s1 is tokenized, such as with a finite-state tokenizer or other computer-based tokenizer that separates the input stream of characters into tokens or words. Finite-state tokenizers are known in the art: see, for example, U.S. Pat. No. 5,721,939 and related techniques disclosed in U.S. Pat. No. 5,488,719. Thus, for example, from the sentence "Hakkinen was again on pole." the tokenization operation produces the tokens "Hakkinen", "was", "again", "on", "pole", and ".". Here, the token "." may be referred to as a sentence-final token, and the others as word tokens.

In box s3, tokens from box s2 are collected, such as in a current-sentence buffer, until a sentence-final token is encountered. The collected sequence of tokens is considered as a sentence. (A list of sentence-final tokens can be defined ahead of time for each language treated, such as periods, questions marks, exclamation points, etc.) Next, the collected tokens of the current sentence from box s3 can be handled as shown in boxes s4 through s9.

In box s4, the tokens from box s3 undergo part-of-speech tagging to obtain part of speech (POS) data indicating the part of speech of each token in the context of the sentence, where "part of speech" is used in the broad sense of a category that indicates the grammatical function of the token in the sentence. The tokens can be morphologically analyzed and part-of-speech tagged to obtain an annotated sentence; the POS data can include an item of data indicating the part of speech determined for each word, appended to the word in the current-sentence buffer. Techniques for part-of-speech tagging are known—see, for example, J. M. Kupiec, "Robust part-of-speech tagging using a hidden Markov model," *Computer Speech and Language*, 6:225–242, 1992 and coassigned International Application WO-A-99/01828, entitled "FSTs Approximating Hidden Markov Models and Text Tagging Using Same". Next, the POS data from box s4 are used to obtain summarized text data defining a summarized version of the text. Boxes s5–s9 illustrate one way in which this could be done.

In box s5, the POS data from box s4 can be used to obtain a verb group annotated version of the sentence. For example, the part-of-speech annotated sentence in the current sentence buffer can be passed through a computer-based verb group annotator which, first, inserts special verb group bracketing symbols into the current sentence buffer, and then, second, inserts special markers identifying the syntactic properties of tokens in each verb group, for example, the head of the verb group, the voice [active/passive]/infinitival] of the verb group, etc. Such techniques are described, for example, in G. Grefenstette, "Sextant. Extracting semantics from raw text, implementation details," *Computer Science Technical Report*, CS92-05, February, 1992, and G. Grefenstette, "Light Parsing as Finite-State Filtering", *Proceedings ECAI'96 Workshop on Extended Finite-State Models of Language*, Budapest, Aug. 11–12, 1996. According to these techniques, each verb group can be passed through a finite-state filter that identifies the principal, or head, verbs of the verb group and a verb head marker can be attached to each of these verbs. This verb head marker depends on the structure of the verb group. Example of verb group head markers include "Head_of_Passive_Verb_Group", "Head_of_Active_Verb_Group", "Head_of_Infinitive_Verb_Group", etc.

In box s6, the POS data from box s4 can be used to obtain a noun group annotated version of the sentence. For example, the verb group annotated current sentence buffer can be similarly passed through a computer-based noun group annotator, which inserts noun group markings into the current sentence buffer, and which marks the heads of noun phrases, indicating syntactic properties of each noun, for example whether the noun is governed by a preposition. See the above-mentioned G. Grefenstette references for details of suitable noun group marking techniques. According to these techniques, each noun group can be passed through a finite-state filter that identifies the principal, or head, nouns of the noun group and a noun head marker is attached to each of these nouns. Examples of noun group head markers are "FreeNoun" (which can be attached to a verb as a subject or object) and "PrepNoun" which is attached to a preposition.

In some embodiments of the present invention, rather than applying only one POS based criterion to determine which tokens should be removed during summarization, any of a set of POS based removal criteria can be used. In the implementation of FIG. 3, the removal criteria are referred to as "reduction levels", but the removal criteria in the set need not be related within a hierarchy of levels or related to each other in any other way. The reduction level—which also determines the degree to which the text is retained by the summarization techniques—need not be permanently fixed, but may be selected by the user from a set of predefined levels (e.g. by conventional user input techniques involving keyboard, display, mouse devices and suitable UI dialog techniques or by a manual selector such as a knob, toggle, dial, or push button (not shown)) at the start of processing a document, or at the start of processing every sentence, or, in lieu of a user selection, may be set at a default level. One of a set of predefined levels may, when selected, may be stored for use until another level is selected.

In box s7a, a signal is received from a user input device selecting one of a set of POS based removal criteria. In the implementation of FIG. 3, the criterion is a reduction level as shown. By selecting a reduction level, the signal from the user input device will indirectly indicate how much text should be retained or, conversely, how much should be removed.

Thus, in box s7, based on the currently set reduction level, the annotations added into the text can be used by a reducing filter that decides which tokens should be retained and which removed. In effect, the reducing filter applies a selected POS based removal criterion. For example, at one level of reduction, a filter may only retain tokens that are either tagged with a preposition part-of-speech tag (/IN, in the example below), or that are preceded by a verb or noun group head markers indicating an important token within a group (such as *HeadN, *ActV, *PrepN in the example below) or that are tagged with a negation part-of-speech tag or that are certain punctuation tokens, such as period in the example below. The effect of using different reduction levels is discussed in more detail below in connection with FIGS. 5–7.

The reducing filter employed in box s7 can be implemented in any appropriate way, including a finite state transducer that receives as input a string of tagged and grouped tokens and provides as output a reduced string. Such a transducer could be produced for each level of reduction using conventional techniques.

Next, in box s8, the part-of-speech tags and the verb and noun group markings are deleted from the current sentence. Then, the remaining text in the current sentence buffer is output, in box s9. In one embodiment, the resulting text is presented to the user as pronounced text using a commercial text-to-speech synthesizer; pronounced text for each level of reduction could be obtained in this way and recorded, for subsequent play back in response to user signals selecting a level of reduction. The resulting text could alternatively be presented in a banner or box on a display screen.

Finally, in box s10, the system checks to see whether the input text has been entirely consumed. If not, the system continues processing input text in box s1; otherwise the system stops.

FIG. 4 illustrates the results of the various acts in FIG. 3 for an exemplary input sentence of text, i.e. with a visualization of the contents of the current sentence buffer added to the image presented on a display after each step.

After the act in box s4, the buffered sentence includes part-of-speech tags, e.g. "/DT" for determiner, "/JJ" for adjective, "/NN" for noun singular, "/NNS" for noun plural, "/VBZ" for a present tense verb, "/SENT" for end of sentence. Then following the acts in boxes s5 and s6, the buffered sentence additionally includes verb group markings (e.g. "[VG", "VG]") and noun group markings ("[NG", "NG]"), respectively. Within verb and noun groups, important tokens, or "heads", may also be marked with preceding items of data such as "*Actv" for an active verb in a verb group and "*HeadN" for an important noun in a noun group. After the filtering act in box s7, only the words "dog", "eats", "bones", "on" and "floor"; the period at the end of the sentence; and their appended tags and verb group and noun group markings remain; all other tokens with their appended tags have been removed in accordance with the POS based removal criterion being applied. After the stripping of the tags and verb group and noun group markings in box s8, the words "dog", "eats", "bones", "on" and "floor" and the period at the end of the sentence are left in the sentence buffer.

FIGS. 5–7 illustrate the results of some of the steps in FIG. 3 for an exemplary input text, showing various levels of reduction, according to an embodiment of the invention in which the output that would result from several different levels of reduction can be displayed for comparison.

As discussed above, the group and head annotated text is fed into the reducing transducer which eliminates (in box s7) words and other tokens depending upon the level of reduction selected by the user (or if none is selected, a default level). Non-comprehensive examples of levels of reductions are the following:

1. only proper names, no subclauses
2. only subjects and object nouns, no subclauses
3. only subjects, head verbs, and object nouns, no subclauses
4. only subjects, head verbs, and object nouns, preposition and dependent noun heads, no subclauses
5. only proper names, including subclauses
6. only subjects and object nouns, including subclauses
7. only subjects, head verbs, and object nouns, including subclauses
8. only subjects, head verbs, and object nouns, preposition and dependent noun heads, including subclauses The original or input text (paragraph) is shown in FIG. 5. The same text after marking up (in boxes s4–s6) is shown in FIG. 6. The resulting output (summary) text for each of the reduction levels 1–4 and 8 mentioned above is illustrated in FIG. 7.

It has been found that using a text-to-speech synthesizer such the publicly available synthesizer rsynth, the original text (FIG. 5) is pronounced in 36 seconds. Pronouncing the text produced by the reduction labeled as level 8 reduction above (in which much of the original meaning is retained) takes only 20 seconds with the same text-to-speech synthesizer, including the time necessary to perform POS markup and shallow parsing.

As will be understood from FIGS. 4–7, the group data included in the marked-up text do not directly indicate tokens that meet applicable POS based removal criteria, but they provide sufficient information to indirectly indicate those tokens. For example, a token (other than a sentence-final token) meets the removal criterion of reduction level 8, above, if it does not have a head marking indicating it is a subject, a head verb, an object noun, or a dependent noun head of a clause or subclause, and if it is not tagged as a preposition.

Variations

The implementations described above could be varied in many ways within the scope of the invention.

An implementation described above uses a computer-based over-the-desk scanning system. The invention is not limited, however, to any specific desktop, portable or workstation based implementation, but may be incorporated in any manner of computer arrangement involving such devices, other processor-controlled devices, such as multi-function machines (capable of scanning, printing, faxing, etc.), and to wired or wireless network arrangements, operating using well known LAN, WAN, and/or internet protocols and incorporating any suitable combination of such devices. For example, the invention could be implemented in a processor-controlled desktop flatbed scanning system. Such systems are well known in the art and are exemplified by the ReadingEdge system formerly available from Xerox Imaging Systems. Alternatively, the hardware configuration may take the form of a conventional computer coupled to suitable user interface peripherals and to a flatbed or paper-feeding desktop scanner, the computer or scanner incorporating suitable OCR software (e.g. TextBridge from ScanSoft, Inc.) capable of generating machine-readable text from scanned documents.

Implementations have been described in terms that may refer to steps, operations, or manipulations involving characters, words, text, etc. Such steps, operations, or manipulations can be implemented, where appropriate, by means of software controlled processor operations upon machine readable (e.g. ASCII code) representations of such characters, words, text, etc., but could also be implemented with hardware operations.

An implementation has been described with reference to shallow parsing, an operation that can use POS tags to group tokens into syntactically-typed groups or "chunks" and can optionally also identify important tokens or "heads" in the groups. The invention could also be implemented with other techniques for obtaining data indicating which tokens meet POS based removal criteria. For example, full parsing techniques could be used, although such techniques may not successfully parse some sentences.

An implementation has been described that obtains a POS tagged sentence and then obtains a summarized version of the sentence before handling the next sentence. The invention could also be implemented to operate on more than one sentence at a time or to operate on text without separating it into sentences.

Implementations have been described in which POS tags and other markup data are included in a sequence of character codes in a buffer. POS tags and other markup data could, however, be stored and handled separately from or in parallel with the text, rather than being included in the text.

Implementations described above apply specific POS based removal criteria in specific ways, but various other POS based removal criteria could be applied, and such criteria could be applied in a variety of ways.

Implementations described above group tokens into verb and noun groups and indirectly indicate which tokens meet POS based removal criteria by indicating heads within such groups, but tokens could be grouped in other ways, and tokens that meet POS based removal criteria could be indicated directly or in any other appropriate way. Tokens may be grouped into groups of additional types, such as prepositional phrase groups and subclause groups (which might include other groups), and tokens meeting other POS based removal criteria can be indicated. Furthermore, tokens that meet or do not meet a removal criterion could be indicated in other ways, rather than by obtaining group data indicating tokens that meet a removal criterion.

Implementations described above receive a signal from a user selecting a POS based removal criterion before the criterion is applied, but a removal criterion could be selected in various other ways. For example, each of a set of removal criteria could be applied to obtain alternative summaries of text, each of which could be converted to an audio recording, and a user could subsequently select for playback the summary produced with one of the criteria, or a summary could be selected for playback in another appropriate way.

An implementation described above uses a finite state transducer as a filter to apply a POS based removal criterion to POS data, but POS based removal criteria could be applied to POS data in other ways, such as by using other types of data structures or by using algorithms.

Implementations are described above in relation to English text, but the invention can be applied to languages other than English.

In implementations described above, specific acts are performed that could be omitted or performed differently. For example, tagged and marked up tokens could be saved in a data structure other than a current sentence buffer.

In implementations described above, acts are performed in an order that could be modified in many cases. For example, the acts in boxes s5 and s6 in FIG. 3 may be inverted in order or collapsed into a single operation without changing the described functionality.

Implementations described above use currently available computing techniques, but could readily be modified to use newly discovered computing techniques as they become available.

Applications

As mentioned above, the invention can be applied in various ways to perform summarization.

The invention can be applied in a reading machine for the blind or visually impaired, to provide audio summaries of documents.

The invention might also be applied in a digital copying machine, multifunction machine, or other machine with scanning and processing capabilities in which optical character recognition can be performed and summaries can be produced and printed or otherwise provided as output.

The invention might also be applied in a Web page summarizer.

Miscellaneous

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method for automatically summarizing text, comprising:
   (a) obtaining input text data defining a text that includes two or more tokens;
   (b1) using the input text data to tokenize the text, the tokenized text including one or more tokenized sentences:
   (b2) obtaining part-of-speech (POS) data indicating parts of speech for tokens in the text of each of the tokenized sentences from (b1);
   (c) using the POS data for each tokenized sentence to obtain group data for the sentence indicating one or more groups of consecutive tokens of the text and indicating, within each group, any tokens that meet a POS-based removal criterion; and
   (d) using the group data for each sentence to obtain summarized text data defining a summarized version of the text for the sentence in which tokens in each group that are indicated as meeting the removal criterion are removed so that the number of tokens in the summarized version of the text for the sentence is less than the number of tokens in the text.

2. The method of claim 1, wherein each tokenized sentence includes, in sequence, two or more word tokens and a sentence-final token, the word tokens each indicating a word of text and the sentence-final token indicating the end of a sentence.

3. The method of claim 1, wherein (a) comprises
   (a1) using an image capture device directed upon an image bearing portable medium containing text matter to generate image data representative of the text matter; and
   (a2) converting the image data to machine readable text data, the text data being a representation of the text matter, the text data being said input text data.

4. The method of claim 1, further comprising:
   (e) converting the summarized text data to audio data, the audio data being a representation of the pronunciation of the words in the summarized text data, and emitting sounds corresponding to said audio data.

5. The method of claim 1, wherein (b), (c), and (d) are performed in one pass through the input text data.

6. A method for automatically summarizing text, comprising:
   (a) obtaining input text data defining a text that includes two or more tokens;
   (b) using the input text data to obtain part-of-speech (POS) data indicating parts of speech for tokens in the text;
   (c) using the POS data to obtain group data indicating one or more groups of consecutive tokens of the text and indicating, within each group, any tokens that meet a POS-based removal criterion; and
   (d) using the group data to obtain summarized text data defining a summarized version of the text in which tokens in each group that are indicated as meeting the removal criterion are removed so that the number of tokens in the summarized version of the text is less than the number of tokens in the text;
wherein (c) comprises:
(c1) obtaining first group type data indicating one or more groups of consecutive tokens that have a first word group type, and, within each group having the first word group type, any tokens that meet a first POS-based removal criterion applicable to groups of the first word group type;
(c2) obtaining second group type data indicating one or more groups of consecutive tokens that have a second word group type, and, within each group having the second word group type, any tokens that meet a second POS-based removal criterion applicable to groups of the second word group type.

7. The method of claim 6, wherein said first word group type is a verb group type, and said first group type data include, for each group having the first word group type, a verb group start element preceding the group and a verb group end element following the group.

8. The method of claim 6, wherein said second word group type is a noun group type, and said second group type data include, for each group having the second word group type, a noun group start element preceding the group and a noun group end element following the group.

9. A system for automatically summarizing text, the system comprising:
input text data defining a text that includes two or more tokens; and
a processor connected for accessing the input text data; the processor automatically summarizing the text; in automatically summarizing, the processor operating to:
use the input text data to tokenize the text, the tokenized text including one or more tokenized sentences;
obtain part-of-speech (POS) data indicating parts of speech for tokens in the text of each of the tokenized sentences;
use the POS data for each tokenized sentence to obtain group data for the sentence indicating one or more groups of consecutive tokens of the text and indicating, within each group, any tokens that meet a POS-based removal criterion; and
use the group data for each sentence to obtain summarized text data defining a summarized version of the text for the sentence in which tokens in each group that are indicated as meeting the removal criterion are removed so that the number of tokens in the summarized version of the text for the sentence is less than the number of tokens in the text.

10. The system of claim 9, wherein the processor operates to automatically summarize the text in one pass through the input text data.

11. An article of manufacture for use in a system for automatically summarizing text; the system including:
input text data defining a text that includes two or more tokens;
a storage medium access device; and
a processor connected for receiving data accessed on a storage medium by the storage medium access device and for accessing the input text data;
the article of manufacture comprising:
a storage medium; and
instruction data stored by the storage medium; the instruction data indicating instructions the processor can execute; the processor, in executing the instructions, automatically summarizing the text; in automatically summarizing, the processor operating to:
use the input text data to tokenize the text, the tokenized text including one or more tokenized sentences;
obtain part-of-speech (POS) data indicating parts of speech for tokens in the text of each of the tokenized sentences;
use the POS data for each tokenized sentence to obtain group data for the sentence indicating one or more groups of consecutive tokens of the text and indicating, within each group, any tokens that meet a POS-based removal criterion; and
use the group data for each sentence to obtain summarized text data defining a summarized version of the text for the sentence in which tokens in each group that are indicated as meeting the removal criterion are removed so that the number of tokens in the summarized version of the text for the sentence is less than the number of tokens in the text.

12. The article of manufacture of claim 11, wherein the processor operates to automatically summarize the text in one pass through the input text data.

13. A method for automatically summarizing text, comprising:
(A) receiving a signal from a user input device selecting one of a set of part-of-speech (POS) based removal criteria and obtaining input text data defining a text that includes two or more tokens;
(B1) using the input text data to tokenize the text, the tokenized text including one or more tokenized sentences;
(B2) obtaining POS data indicating parts of speech for tokens in the text of each of the tokenized sentences from (B1); and
(C) using the POS data for each tokenized sentence to obtain summarized text data defining a summarized version of the text for the sentence in which tokens are removed in accordance with the selected POS based criterion so that the number of tokens in the summarized version of the text for the sentence is less than the number of tokens in the text.

14. The method of claim 13 in which (A) comprises:
(A1) displaying on a display device an image showing the set of POS based removal criteria; and
(A2) receiving the signal from the user input device, the signal selecting the selected POS based removal criterion.

15. The method of claim 13, further comprising:
(D) converting the summarized text data to audio data, the audio data being a representation of the pronunciation of the words in the summarized text data, and emitting sounds corresponding to said audio data.

16. The method of claim 13, wherein (A), (B), and (C) are performed in one pass through the input text data.

17. A system for automatically summarizing text, the system comprising:
input text data defining a text that includes two or more tokens; and
a processor connected for accessing the input text data; the processor automatically summarizing the text; in automatically summarizing, the processor operating to:
receive a signal from a user input device selecting one of a set of part-of-speech (POS) based removal criteria;
use the input text data to tokenize the text, the tokenized text including one or more tokenized sentences;

obtain POS data indicating parts of speech for tokens in the text of each of the tokenized sentences; and use the POS data for each tokenized sentence to obtain summarized text data defining a summarized version of the text for the sentence in which tokens are removed in accordance with the selected POS based criterion so that the number of tokens in the summarized version of the text for the sentence is less than the number of tokens in the text.

18. The system of claim 17, wherein the processor operates to automatically summarize the text in one pass through the input text data.

19. An article of manufacture for use in a system for automatically summarizing text; the system including:

input text data defining a text that includes two or more tokens;

a storage medium access device; and a processor connected for receiving data accessed on a storage medium by the storage medium access device and for accessing the input text data;

the article of manufacture comprising:

a storage medium; and instruction data stored by the storage medium; the instruction data indicating instructions the processor can execute; the processor, in executing the instructions, automatically summarizing the text; in automatically summarizing, the processor operating to:

receive a signal from a user input device selecting one of a set of part-of-speech (POS) based removal criteria;

use the input text data to use the input text data to tokenize the text, the tokenized text including one or more tokenized sentences;

obtain POS data indicating parts of speech for tokens in the text of each of the tokenized sentences; and use the POS data for each tokenized sentence to obtain summarized text data defining a summarized version of the text for the sentence in which tokens are removed in accordance with the selected POS based criterion so that the number of tokens in the summarized version of the text for the sentence is less than the number of tokens in the text.

20. The article of manufacture of claim 19, wherein the processor operates to automatically summarize the text in one pass through the input text data.

* * * * *